United States Patent [19]

Hammond et al.

[11] 3,899,593

[45] Aug. 12, 1975

[54] XYLITOL CHEWING GUM

[75] Inventors: John E. Hammond, Ridgewood, N.J.; Thomas K. Streckfus, Yonkers, N.Y.

[73] Assignee: General Foods Corporation, White Plains, N.Y.

[22] Filed: June 24, 1974

[21] Appl. No.: 482,120

Related U.S. Application Data

[63] Continuation of Ser. No. 102,139, Dec. 28, 1970, abandoned.

[52] U.S. Cl. .................................................. 426/3
[51] Int. Cl.² .......................................... A23G 3/30
[58] Field of Search ................................. 426/3–6

[56] References Cited
UNITED STATES PATENTS
2,886,441   5/1959   Kramer et al. .......................... 426/3
3,296,079   1/1967   Griffin ................................. 426/217
3,352,689   11/1967  Bilotti ..................................... 426/3

*Primary Examiner*—Jeanette M. Hunter
*Attorney, Agent, or Firm*—Thomas R. Savoie; Daniel J. Donovan; Bruno P. Struzzi

[57] ABSTRACT

A confectionary composition and more particularly a chewing gum composition is prepared which is free from both sucrose and artificial sweeteners and which presents a pleasant cooling effect in the mouth of the consumer. The confections of this invention are prepared from compositions containing a major amount of xylitol.

8 Claims, No Drawings

XYLITOL CHEWING GUM

This is a continuation, of application Serial No. 102,139, filed Dec. 28, 1970 now abandoned.

BACKGROUND AND SUMMARY OF THE INVENTION

Sugarless confectionary compositions, and in particular sugarless chewing gums, have become desirable food items due to the efforts of the dental profession in discouraging the use of sucrose-containing confectionaries.

Heretofore most successful attempts to produce sugarless chewing gums have involved the use of an artificial sweetener together with sorbitol and/or mannitol in place of the sucrose present in conventional chewing gums, and the substitution of various hydrophilic colloids (e.g. gums) for the corn syrup present in conventional chewing gums. Recently however, artificial sweeteners have been viewed with some disfavor by medical authorities and the public has become cautious about consuming artificially sweetened foods; additionally, some artificial sweeteners leave an unfavorable aftertaste in the mouth of the consumer. It has also been a problem to produce sugarless chewing gums which simulate the texture and chewing characteristics of conventional chewing gum.

The present invention overcomes the problems encountered in most of the previous attempts at formulating a sugarless chewing gum by producing a chewing gum composition wherein the sucrose and corn syrup components of conventional chewing gums are replaced by xylitol and glycerol respectively.

It is an object of this invention to produce a sugarless chewing gum which is free from artificial sweeteners and which produces a pleasant cooling effect in the mouth of the consumer.

It is a further object of this invention to produce a sugarless chewing gum which simulates the texture and chewing characteristics of conventional chewing gum.

It is a further object of this invention to produce a new sugarless chewing gum composition containing effective amounts of xylitol and glycerol.

These and other objects will become apparent from the description herein.

DESCRIPTION OF THE INVENTION

Xylitol is a pentahydric alcohol which is prepared most commonly by the hydrolysis of xylan (a common constituent of wood, corncobs and oilseed hulls) to form xylose, followed by the reduction of xylose to xylitol by hydrogenation under pressure in the presence of a nickel catalyst. Xylitol appears as a crystalline compound which possesses a sweetness level of about 90% that of sucrose, and xylitol is metabolized in the body to glycogen by way of the Pentose-phosphate pathway and is thus safely consumed by diabetics.

Xylitol is readily soluble in water, possesses a relatively large negative heat of solution and is capable, when present in sufficient quantities of producing a cooling effect in the mouth.

According to the present invention a sugarless chewing gum composition is formed with from about 50 to 80% by weight of xylitol, from about 18 to 30% by weight of a gum base, from about 2 to 6% by weight of glycerol and sufficient flavor and color agents to produce a commercially desirable product. A more preferred proportion for xylitol when xylitol is used as the exclusive replacement for the sucrose of conventional chewing gum is from about 65% to 80%.

It is also contemplated by this invention to include minor amounts (up to about 30% by weight) of sorbitol and/or mannitol in the formulation in addition to the xylitol; however, it is an essential feature of this invention that the xylitol be present in the formulation at a level which will lend sufficient sweetness to the composition and which will also yield the desirable cooling effect. This will normally require the presence of xylitol in the chewing gum composition in the amount of at least 50% by weight.

The gum bases which may be employed in this invention may include natural gums, synthetic resins, waxes, fillers and softeners. The commercially available chickle gum bases have proven quite satisfactory for use in this invention as have the synthetic gum bases now also commercially available.

The glycerol component is used in this invention in order to soften the gum base to the extent that the base will be capable of binding the crystalline material. The final texture and chewing characteristics of the gum can be controlled by varying the amount of glycerol in the composition.

Flavor and color agents may be added to the chewing gum composition of this invention as desired. Flavoring agents include all natural, essential or synthetic flavoring oils and compounds normally accepted for food use.

This invention is further illustrated, but not limited by the following example.

EXAMPLE

A sugarless chewing gum consisting of:

| | |
|---|---|
| Xylitol | 71% |
| Gum Base | 24% |
| Glycerol | 4% |
| Flavor | 1% | is prepared by heating the gum base to 150°F in a mixer, adding the glycerol to the base and mixing for about 5 minutes, adding the xylitol to the mixer and continuing the mixing for another 5 minutes. The mixture is then cooled to 40°F and the flavor is added and mixed. The resulting composition is then formed into sheets, cut into sticks and wrapped.

Having thus described the invention what is claimed is:

1. A sugarless chewing gum which presents a pleasant cooling effect in the mouth comprising on a weight basis xylitol 50 to 80% and gum base 18% to 30%.

2. A sugarless chewing gum according to claim 1 which is free of artificial sweeteners.

3. A sugarless chewing gum according to claim 1 which contains minor amounts of sorbitol and/or mannitol.

4. A sugarless chewing gum which presents a pleasant cooling effect in the mouth consisting essentially of 50 to 80% xylitol by weight, sorbitol, mannitol, gum base, glycerol and effective amounts of flavor and color agents.

5. A chewing gum which presents a pleasant cooling effect in the mouth consisting essentially of 50 to 80% xylitol by weight, gum base, glycerol and effective amounts of flavor and color agents.

6. A chewing gum according to claim 5 which contains on a weight basis 65 to 80% xylitol, 18 to 30% gum base and 2 to 6% glycerol.

7. A sugarless chewing gum according to claim 1 further comprised of an amount of glycerol sufficient to soften said gum base.

8. A sugarless chewing gum according to claim 7 wherein said amount of glycerol is from 2 to 6% by weight.

* * * * *